(12) United States Patent
Choi et al.

(10) Patent No.: US 12,191,079 B2
(45) Date of Patent: Jan. 7, 2025

(54) COMPOSITE ELECTRODES FOR SUPERCAPACITORS, TERNARY MATERIALS WITH FLOWER-LIKE MOLYBDENUM DISULFIDE STRUCTURES, AND RELATED METHODS

(71) Applicant: Purdue Research Foundation, West Lafayette, IN (US)

(72) Inventors: Jong Hyun Choi, West Lafayette, IN (US); Jaehoon Ji, Princeton, NJ (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/594,193

(22) Filed: Mar. 4, 2024

(65) Prior Publication Data

US 2024/0296998 A1    Sep. 5, 2024

Related U.S. Application Data

(60) Provisional application No. 63/488,493, filed on Mar. 4, 2023.

(51) Int. Cl.
| | |
|---|---|
| *H01G 11/36* | (2013.01) |
| *H01G 11/24* | (2013.01) |
| *H01G 11/26* | (2013.01) |
| *H01G 11/86* | (2013.01) |

(52) U.S. Cl.
CPC ............ *H01G 11/36* (2013.01); *H01G 11/24* (2013.01); *H01G 11/26* (2013.01); *H01G 11/86* (2013.01)

(58) Field of Classification Search
None
See application file for complete search history.

(56) References Cited

U.S. PATENT DOCUMENTS

| | | | | |
|---|---|---|---|---|
| 2009/0272946 A1* | 11/2009 | Lu | .......... | H01G 11/38 |
| | | | | 252/502 |
| 2012/0213995 A1* | 8/2012 | Li | .......... | B82Y 40/00 |
| | | | | 977/762 |
| 2023/0187146 A1 | 6/2023 | Choi et al. | | |

FOREIGN PATENT DOCUMENTS

CN    108630449 A  * 10/2018  ............. H01G 11/26

OTHER PUBLICATIONS

Jian, et. al., "Designing a Carbon Nanotubes-Interconnected ZIF-Derived Cobalt Sulfide Hybrid Nanocage for Supercapacitors", J. Mater. Chem A, (2019), 7, pp. 1479-1490.

Jian, X. et al., "Flexible and Freestanding MoS2/rGO/CNT Hbrid Fibers for High-Capacity All-Solid Supercapacitors", Carbon 172 (2021) pp. 132-137.

(Continued)

*Primary Examiner* — Eric W Thomas
(74) *Attorney, Agent, or Firm* — Hartman Global IP Law; Gary M. Hartman; Domenica N. S. Hartman

(57) ABSTRACT

Composite electrodes, supercapacitors equipped therewith, ternary materials for composite electrodes, and related methods. Such a composite electrode has a composite CNT-ZIF structure formed of a conductive network of carbon nanotubes (CNT) and a zeolitic imidazole framework (ZIF) coating covering the conductive network. A layer of molybdenum disulfide ($MoS_2$) structures having flower-like morphologies is disposed on the composite CNT-ZIF structure. The $MoS_2$ structures have pores that provide diffusion paths for ions to and/or from the ZIF coating and/or the conductive network of CNT.

14 Claims, 10 Drawing Sheets

(56) References Cited

OTHER PUBLICATIONS

Pandiyarajan, et al., "Designing an Interlayer-Widened MoS2-Packed Nitrogen-Rich Carbon Nanotube Core-Shell Structure for Redox-Mediated Quasi-Solid-State Supercapacitors", ACS Appl. Energy Mater. (2021), 4, pp. 2218-2230.

* cited by examiner

COMPOSITE ELECTRODES FOR SUPERCAPACITORS, TERNARY MATERIALS WITH FLOWER-LIKE MOLYBDENUM DISULFIDE STRUCTURES, AND RELATED METHODS

CROSS-REFERENCE TO RELATED APPLICATIONS

This application claims the benefit of provisional U.S. Patent Application No. 63/488,493 filed Mar. 4, 2023, the contents of which are incorporated herein by reference.

STATEMENT REGARDING FEDERALLY SPONSORED RESEARCH

This invention was made with government support under award Nos. 1334088 and ECCS 2151887 awarded by the U.S. National Science Foundation. The government has certain rights in the invention.

BACKGROUND OF THE INVENTION

The invention generally relates to supercapacitors, and particularly relates to composite electrodes for supercapacitors, ternary materials having flower-like molybdenum disulfide structures for composite electrodes, and related methods of manufacturing ternary materials.

Supercapacitors present not only excellent energy-storage performances but also long cycle life (above $10^5$ cycles) and fast rechargeability. Supercapacitors yielding high energy densities (e.g., greater than 20 Wh/kg) and high power densities (e.g., greater than 2,000 W/kg) have attracted significant attention due to the rapid growth of global energy consumption and the increased demand for energy decarbonization. While the devices may hold a greater energy density than conventional capacitors, they are not competitive against Li-ion batteries which often have energy densities over 100 Wh/kg. Thus, Li-ion batteries have dominated the most application markets despite the promising traits of supercapacitors, including high power densities, quick charging/discharging, and high stability.

Supercapacitors contain an electrolyte (solid or liquid) that ionically connects a pair of electrodes. Supercapacitors operate by accumulating and releasing ions at their electrodes. The mechanism of ion adsorption and desorption to and from the electrode surfaces contributes to charge and discharge of a supercapacitor. By applying voltage to the electrodes, ions are drawn to the surface of the electrode having an opposite polarity, and the supercapacitor is charged. Conversely, the ions move away from the electrode surfaces when the supercapacitor is discharged. This process allows a supercapacitor to be charged and discharged repeatedly.

Capacitance is proportional to the surface area of the electrodes, and therefore activated carbon is attractive for use as supercapacitor electrode materials due to its large surface area. Nonetheless, supercapacitors have not yet become competitive against Li-ion batteries due to lower energy densities of the former. To overcome this limitation, significant efforts have been devoted to developing high energy density supercapacitor electrodes by blending heteromaterials to exploit their distinct benefits. In the past, various approaches for achieving this goal have been focused on improving two distinct mechanisms: surface-controlled electrical double-layer capacitance (EDLC) and diffusion-controlled faradaic pseudocapacitance (FPC). EDLC can be improved by increasing the specific area of the electrode since it operates by accumulating and releasing ions at the electrode. Research has reported the effects of increased surface area on electrode performance by decorating percolated carbon nanotubes (CNT) with zeolitic imidazole frameworks (ZIF). According to this research, ZIF forms a porous structure that promotes ion diffusion and offers a large surface area on the conductive CNT networks. CNT-ZIF composite electrodes have demonstrated a high specific capacitance of about 320 F/g, which is about five times greater than that of a pristine CNT electrode. On the other hand, diffusion-controlled energy storage may be governed by the surface reactivity of the electrode. For example, research has reported an exfoliated molybdenum disulfide ($eMoS_2$)-coated and S-doped ZIF supercapacitor electrode to enhance the charge transfer efficiency. Molybdenum disulfide ($MoS_2$) is a type of transition metal dichalcogenides (TMD). As the doped sulfur atoms have low electronegativity, the porous structure may be favorable for electron transfer. Moreover, the coated $eMoS_2$ structure can provide additional reactivity to the ZIF via pseudocapacitive reaction between ions and $MoS_2$. As a result, the composite electrode generated a six-fold greater redox current than the pure ZIF electrode.

Though such advancements have been reported, there continues to be a need to improve the performance of supercapacitors, for example, by improving performance characteristics of electrodes used in supercapacitors, so that high-performance supercapacitors become available that can complement and/or rival Li-ion batteries for energy storage.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, composite electrodes capable of use in supercapacitors, ternary materials for composite electrodes, and methods of manufacturing ternary materials.

According to a nonlimiting aspect of the invention, a composite electrode comprises a composite CNT-ZIF structure formed of a conductive network of carbon nanotubes (CNT) and a zeolitic imidazole framework (ZIF) coating covering the conductive network. A layer of molybdenum disulfide ($MoS_2$) structures is disposed on the composite CNT-ZIF structure. The $MoS_2$ structures have pores that provide diffusion paths for ions to and/or from the ZIF coating and/or the conductive network of CNT. The $MoS_2$ structures preferably have a flower-like ($fMoS_2$) morphology.

According to another nonlimiting aspect, a supercapacitor includes the composite electrode as described herein and an electrolyte configured to provide ions for adsorption and/or desorption on the composite electrode.

According to yet another nonlimiting aspect, a method is provided for fabricating a ternary electrode material having a flower-like $MoS_2$ ($fMoS_2$) morphology. The method includes fabricating a $MoS_2$ structure on a composite CNT-ZIF structure to form the ternary composite electrode material. The composite CNT-ZIF structure includes a CNT core surrounded by a porous ZIF shell. During the fabricating step, architecture of the $MoS_2$ structure is controlled by adjusting the molar ratio of Mo and S reagents so as to form edge-rich flower-like $MoS_2$ structures with sulfur vacancies ($fMoS_2$).

According to still another nonlimiting aspect, ternary material is provided that includes a composite CNT-ZIF structure comprising a conductive network of carbon nanotubes (CNT) and a zeolitic imidazole framework (ZIF) coating covering the conductive network. A layer of molybdenum disulfide ($MoS_2$) structures is disposed on the composite CNT-ZIF structure. The $MoS_2$ structures comprise pores that provide diffusion paths for ions to and/or from the ZIF coating and/or the conductive network of CNT. The $MoS_2$ structures preferably have a flower-like ($fMoS_2$) morphology.

Technical aspects of composite electrodes, supercapacitors, ternary materials, and methods as described above preferably include the ability to improve the performance characteristics of electrodes in supercapacitors.

These and other aspects, arrangements, features, and/or technical effects will become apparent upon detailed inspection of the figures and the following description.

BRIEF DESCRIPTION OF THE DRAWINGS

In FIG. 1A, the $MoS_2$ has a flower-like ($fMoS_2$) structure (also referred to herein as morphology), yielding what is referred to herein as CNT-ZIF-$fMoS_2$. FIG. 1A also identifies nonlimiting processing steps for synthesizing the CNT-ZIF-$fMoS_2$ electrode material according to aspects of the invention.

DETAILED DESCRIPTION OF THE INVENTION

Figure 1A:
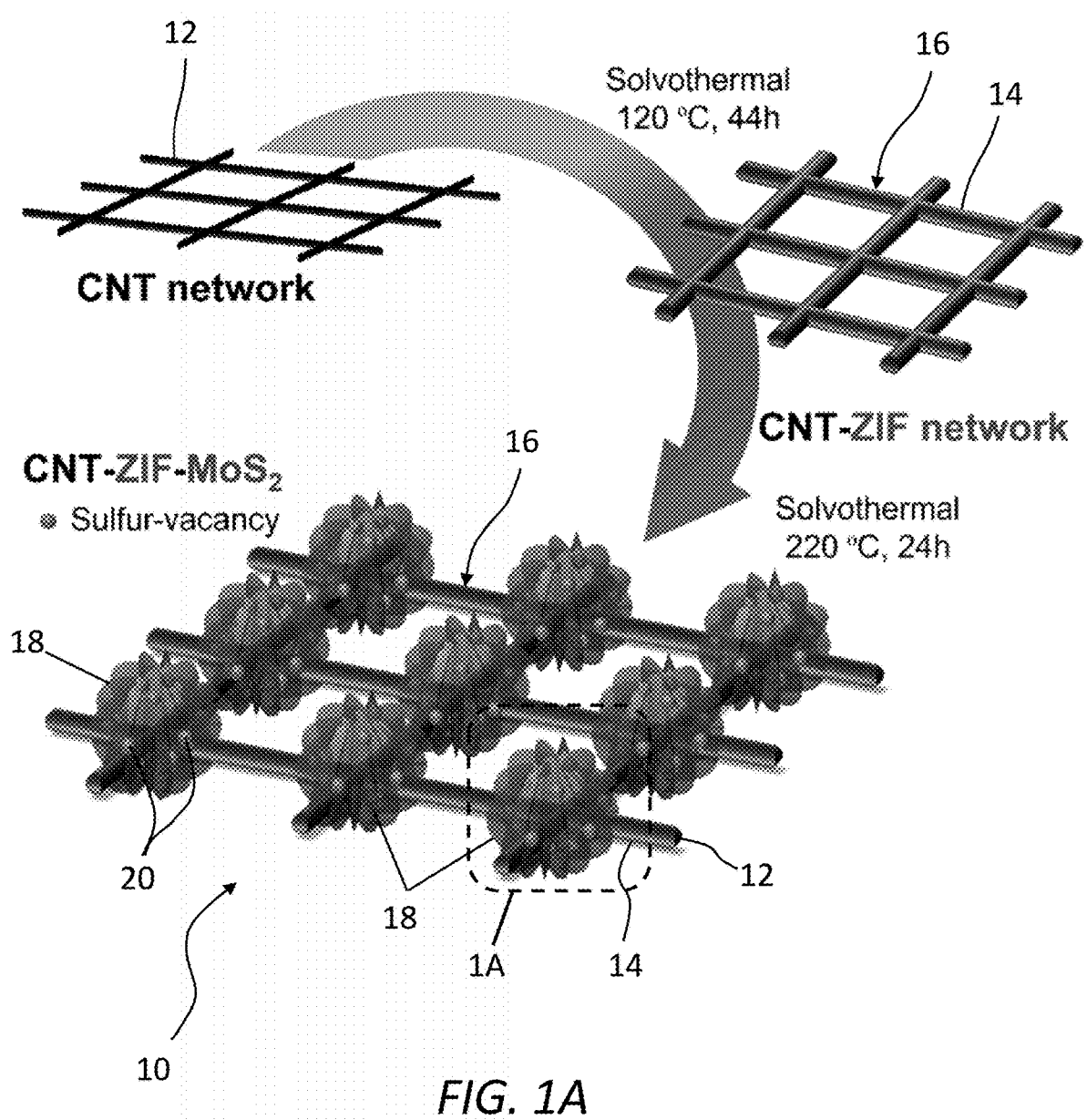
FIG. 1A is a schematic diagram of an electrode material comprising carbon nanotubes (CNT), a zeolitic imidazole framework (ZIF), and molybdenum disulfide ($MoS_2$) yielding what is referred to herein as ternary CNT-ZIF-$MoS_2$.

The intended purpose of the following detailed description of the invention and the phraseology and terminology employed therein is to describe what is shown in the drawings, which include the depiction of and/or relate to one or more nonlimiting embodiments of the invention, and to describe certain but not all aspects of the embodiment(s) to which the drawings relate. The following detailed description also describes certain investigations relating to the embodiment(s) depicted in the drawings, and identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter believed to be aspects of the invention, including certain but not necessarily all of the aspects and alternatives described in the detailed description.

The present disclosure provides hierarchical stem-like carbon nanotube (CNT) networks with molybdenum disulfide ($MoS_2$) structures, most preferably flower-like $MoS_2$ structures ($fMoS_2$), that are capable of use as hybrid (composite) electrode materials of supercapacitors. The present disclosure further discloses morphology engineering of composite electrodes comprising ternary composite materials of CNT, ZIF, and $MoS_2$ (CNT-ZIF-$MoS_2$ materials) to achieve ultrahigh energy densities while retaining excellent properties for use in supercapacitors. The constituent materials were selected to offer distinct merits by considering the working mechanisms of electrochemical energy-storing applications. A core framework made of CNT enables efficient charge transfer with high conductivity. A porous ZIF structure provides ion-diffusion paths for rapid ion charging and discharging. A $MoS_2$ layer covering the ZIF structure was determined to increase the extent of ion accumulation with high ion capacity, which in combination with the CNT core framework and ZIF structure confer synergetic effects to the heteromaterials.

A method of producing a composite electrode in accordance with some aspects of the present invention includes topochemical synthesis of $MoS_2$ on a CNT-ZIF network to modify the $MoS_2$ morphology, for example, with the aforementioned flower-like structures ($fMoS_2$). A solvothermal process can be used to coat a CNT network with a ZIF layer. A second solvothermal process can be used to deposit $MoS_2$ on the CNT-ZIF stem-like network. The $MoS_2$ is preferably deposited to have sulfur vacancies and create the flower-like structure. The flower-like structure with sulfur vacancies (i.e., dangling molybdenum atoms) forms $MoS_2$ flakes with many edges, offering a large surface area of faradaic active sites. Ternary (composite) electrodes produced in this manner were determined to exhibit an ultrahigh energy density, for example, up to about 80 Wh/kg, and to outperform other carbon or $MoS_2$-based devices. The results of investigations of the electrodes and methods disclosed herein suggest that the high-performance supercapacitors can be achieved by considering synergetic interactions of multi-component materials and engineering their morphologies to enhance both ion accumulation and faradaic reaction.

According to some aspects of the disclosure, a composite electrode for a supercapacitor includes a composite CNT-ZIF structure formed by a conductive network of carbon nanotubes (CNT network) and a zeolitic imidazole framework (ZIF) coating covering the conductive network to provide high ion diffusivity. A layer of molybdenum disulfide ($MoS_2$) structures is disposed on the composite CNT-ZIF structure. The $MoS_2$ structures have pores (small openings) that provide diffusion paths for ions to and/or from the ZIF coating and/or the conductive network of CNT. $MoS_2$ flakes forming the MoS$_2$ structures preferably have a flower-like (fMoS$_2$) morphology, although other morphologies that have small openings to provide similar diffusion paths are also within the scope of the invention. In some embodiments, the electrode may provide an energy density of up to at least about 78 Wh/kg., a power density of up to at least about 3,000 W/kg, and/or up to at least about 90% of capacitance retention over 3,000 cycles.

According to other aspects of the disclosure, a supercapacitor can be formed with at least one composite electrode such as described above, and an electrolyte to transfer ions between the composite electrode and a second electrode and accumulate and/or release ions on the composite electrode.

According to yet other aspects of the disclosure, a method of fabricating a ternary composite electrode material having a flower-like MoS$_2$ (fMoS$_2$) morphology for a composite electrode as described above includes fabricating one or more MoS$_2$ structures on a composite CNT-ZIF structure to form the ternary composite electrode material. The composite CNT-ZIF structure has a CNT core surrounded by a porous ZIF shell. During the fabricating step, the architecture of the MoS$_2$ structure(s) is controlled by adjusting the molar ratio of Mo and S reagents so as to form edge-rich flower-like MoS$_2$ structures (fMoS$_2$) with sulfur vacancies. The composite CNT-ZIF structure may be formed by growing porous ZIF on CNT network via a solvothermal process. Fabricating the layer of MoS$_2$ may include adjusting the molar ratio of Mo and S reagents to provide excessive supply of sulfur precursors relative to molybdenum molecules, for example, in a Mo:S ratio of approximately 1:8.

Turning now to the nonlimiting embodiments represented in the drawings, FIG. 1A schematically depicts the synthesis of a ternary electrode material of CNT-ZIF-fMoS$_2$ that forms a hierarchical composite, which can be used as a composite electrode (also called a hybrid electrode herein) 10 for a supercapacitor according to aspects of the present invention. The composite electrode 10 has a core of conductive CNT networks 12 covered by a ZIF coating 14, thereby forming a composite CNT-ZIF structure 16. A layer of MoS$_2$ structures 18 is disposed on the outer surface of the composite CNT-ZIF structure 16.

Figure 1B:
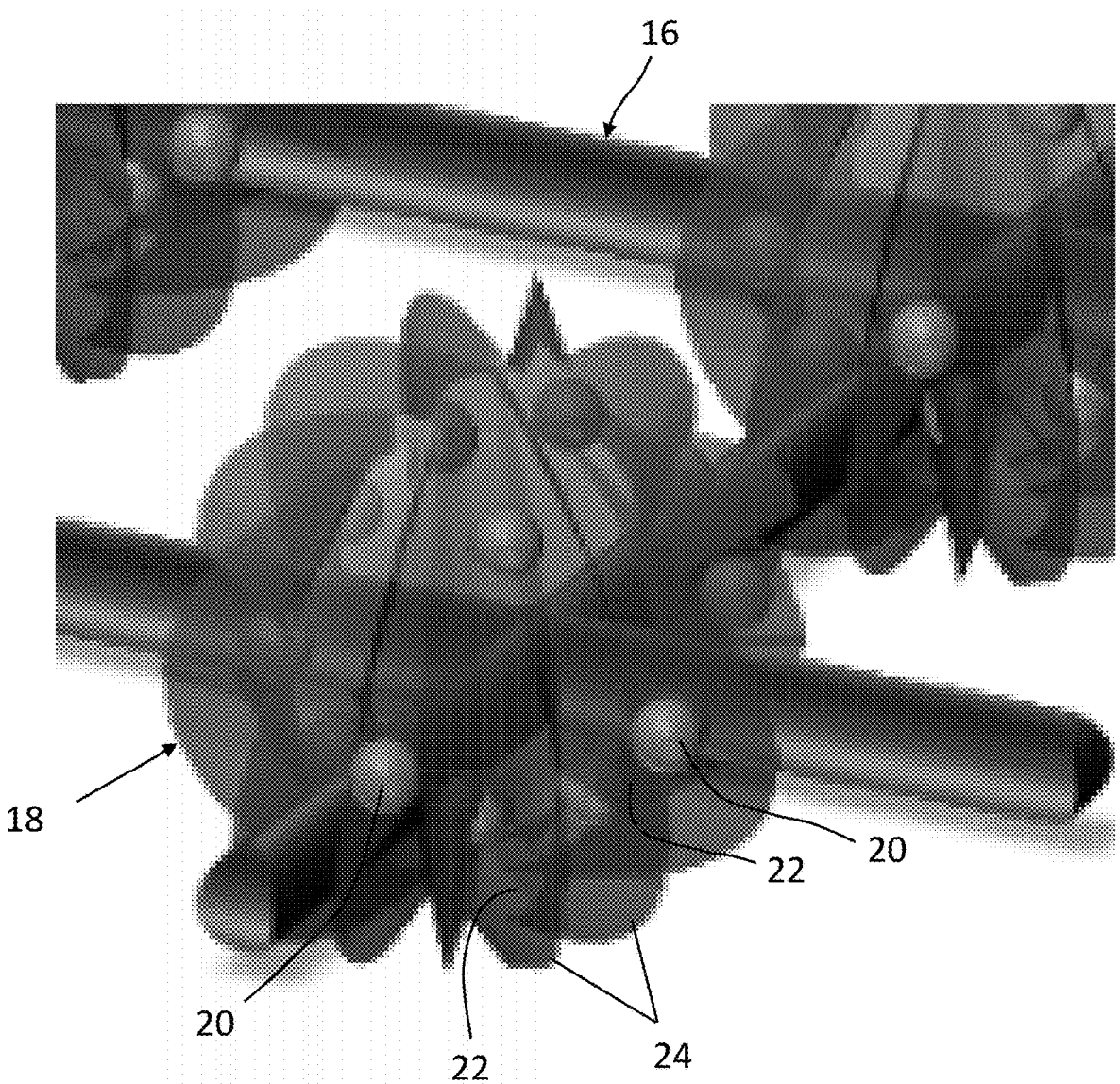
FIG. 1B is an enlarged view of an $fMoS_2$ structure of FIG. 1A.

As best seen in the enlarged view of FIG. 1B, the MoS$_2$ structures 18 in this example are edge-rich MoS$_2$ structures having a flower-like morphology (fMoS$_2$). The fMoS$_2$ structures have a large number of small openings or pores 20 and multiple "petals" 22 that define a large number of edges 24. The pores 20 are formed by sulfur vacancies in the MoS$_2$ structures 18. The pores 20 are believed to provide diffusion paths for ions to and/or from the underlying ZIF coating 14 and/or the conductive CNT networks 12. Other morphologies are also possible and within the scope of the present disclosure, some of which are discussed hereinafter.

In investigations leading to the present invention, ternary composite materials suitable for the composite electrode 10 were prepared by sequential solvothermal processes of the porous ZIF coating 14 and the flower-like MoS$_2$ structure (fMoS$_2$) 18 on percolated stem-like CNT networks 12. The core CNT networks 12 are believed to deliver the charges to the system efficiently given their highly conductive nature. The ZIF coating 14 is believed to promote ion diffusivity of the electrode 10 with the pore-rich conformation. The fMoS$_2$ structures 18 have large surface areas for electric double layers, while the exposed edges 24 and the pores 20 facilitate faradaic reactions, thus drastically improving the energy-storage performance of the supercapacitor.

Hereinafter, information is presented relating to certain experiments conducted in developing ternary composite materials intended for use as a composite electrode of a supercapacitor, as well as methods of fabricating such materials. The details of these experiments are provided as non-limiting examples only, it being understood that variations on the methods, materials, and results used in these experiments may be possible and within the scope of the invention.

Hybrid electrodes 10 according to certain non-limiting aspects of the present disclosure were prepared by synthesizing the ZIF coating 14 and the MoS$_2$ structures 18 on CNT networks 12 via sequential synthesis processes. The CNT networks 12 were prepared by dispersing HiPco single-wall nanotube powders and dopamine hydrochloride in dimethylformamide (DMF) with tip-sonication. Then, the porous ZIF coating 14 was grown on the CNT 12 via solvothermal process. 1h-1,2,4-triazole-3-thiol and zinc chloride with a mass ratio of 1:2 were added to the CNT-dispersed solution as precursors of ZIF and reacted in the mixture at 120° C. for 44 hours. Thiolated (—SH) triazole molecules were adopted to form the foundation of the ZIF, which may facilitate sulfide bonds between the thiol groups and the MoS$_2$ layer. The MoS$_2$ structure 18 determining the supercapacitor's morphology and performance was subsequently fabricated on the composite CNT-ZIF structure 16 through another solvothermal method at 220° C. for 24 hours. Thiourea and ammonium heptamolybdate tetrahydrate were blended in a CNT-ZIF-containing aqueous solution to provide sulfur (S) and molybdenum (Mo) precursors. The architecture of the MoS$_2$ structures 18 was controlled by adjusting the molar ratio of Mo and S reagents. The excessive supply of sulfur precursors to molybdenum molecules (e.g., Mo:S=1:8) resulted in edge-rich flower-like MoS$_2$ structures with sulfur vacancies (termed fMoS$_2$), as shown schematically in FIGS. 1A and 1B. In contrast, transition metal dichalcogenides (TMD) prepared with the stoichiometric ratio (1:2) exhibited a stacked-plate-like structure (termed pMoS$_2$).

In some non-limiting working examples conducted for experimental purposes, different CNT-ZIF-MoS$_2$ composites (ternary composites) were prepared as hybrid supercapacitor electrodes with sequential synthesis processes. The methods included uniform dispersion of conducting CNT, growth of ion diffusive ZIF on the percolated CNT network, and synthesis of various morphologies of MoS$_2$ to enhance the surface area and the faradaic reactivity. In particular, it is believed that the last step of developing MoS$_2$ layers has great importance since the energy-storage behaviors of the supercapacitor electrodes appear to be determined by the surface structures of the composites.

CNT in powder form was processed with a high-pressure, gas-phase decomposition of CO (HiPco) method. Approximately 5 mg of CNT powders and 30 mg of dopamine hydrochloride were dispersed in 30 ml of dimethylformamide (DMF). For an efficient dispersion, the powder-containing solution was tip-sonicated for 30 minutes. Then, the CNT-dopamine solution was incubated at room temperature for 2 hours, where the dopamine molecules may envelop the CNT via van der Waals interaction. The coated dopamine layer was then used as nucleation sites for growing ZIF structures.

Subsequently, approximately 30 mg of zinc chloride and 15 mg of 1h-1,2,4-triazole-3-thiol were added to the CNT-dopamine solution. The two chemicals are the precursors of the ZIF. The mixtures were then sonicated again for 10 minutes to form a uniform blend and prohibit aggregation of the CNT networks. The complexes were incubated at 120° C. for 44 hours in a convective oven to allow the complete formation of ZIF crystals. The solution containing CNT-ZIF composites then was cooled down for two hours. Next, the CNT-ZIF solution was vacuum-filtrated through a porous polytetrafluoroethylene (PTFE) membrane with 200 nm pores. As the liquid permeated and diffused through the membrane, a CNT-ZIF film on the membrane was obtained. The film was washed with an excessive amount of ethanol and then baked at 110° C. overnight to eliminate unwanted impurities. Then, the film was ground into powders and subsequently dispersed in 40 mL of deionized water. Achieving the CNT-ZIF powders made it possible to exchange the original solvent (i.e., DMF) to the aqueous medium in order to conduct the morphology-controllable synthesis of $MoS_2$ in a hydrothermal process.

Figure 4A:
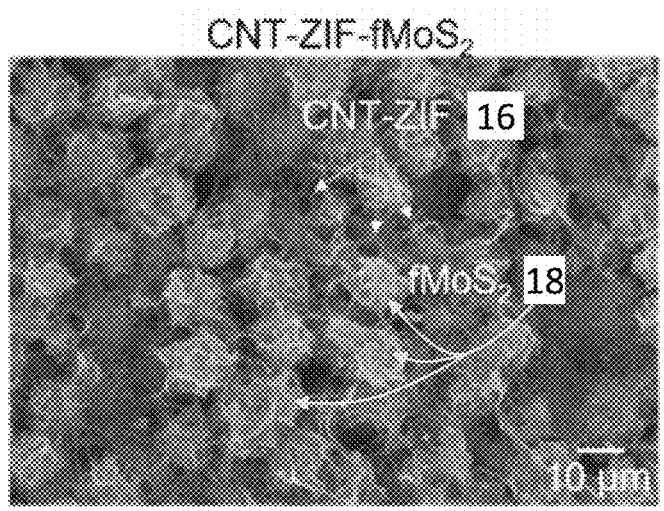
FIGS. 4A-4C are SEM images of CNT-ZIF-$MoS_2$ materials in which, respectively, the $MoS_2$ has a flower-like ($fMoS_2$) structure (CNT-ZIF-$MoS_2$) (FIG. 4A), the $MoS_2$ has a stacked-plate ($pMoS_2$) structure (CNT-ZIF-$pMoS_2$) (FIG. 4B), and the $MoS_2$ has an exfoliated-flake ($eMoS_2$) structure (CNT-ZIF-$eMoS_2$) (FIG. 4C).

Lastly, $MoS_2$ layers were synthesized on top of CNT-ZIF web-like structures with another solvothermal method. Three different sets of the ternary composites were prepared, including (i) flower-like $MoS_2$ ($fMoS_2$) and (ii) stacked-plates $MoS_2$ ($pMoS_2$), and (iii) chemically exfoliated $MoS_2$ ($eMoS_2$) on the CNT-ZIF tubular structures. For the $fMoS_2$ growth, approximately 30 mg of ammonium heptamolybdate tetrahydrate (HMT, molybdenum precursor) and 100 mg of thiourea (sulfur precursor) were added in the aqueous CNT-ZIF solution. The solution was then tip-sonicated for 20 minutes to obtain a homogeneous mixture and transferred to a Teflon-lined stainless-steel autoclave. The autoclave temperature was maintained at 220° C. overnight to form $fMoS_2$ structures with many petal-like nanoflakes on CNT-ZIF, as shown in FIG. 4A. The flower-like structures could be obtained by mixing the unbalanced ratio of molybdenum (Mo) and sulfur (S) precursors. The synthesis conditions were determined to obtain the unique morphologies. For example, it is known that $MoS_2$ samples synthesized at 160° C. showed an architecture of aggregated nanoparticles, whereas the material prepared at a temperature above 200° C. showed petal-like $MoS_2$ layers.

Figure 4B:
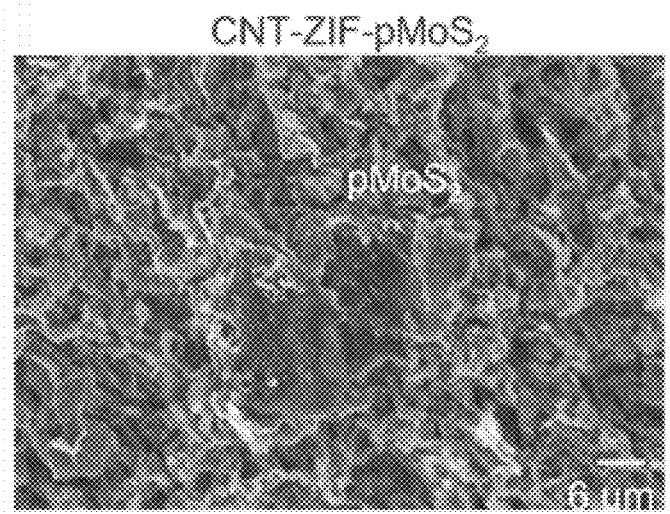
Figure 4C:
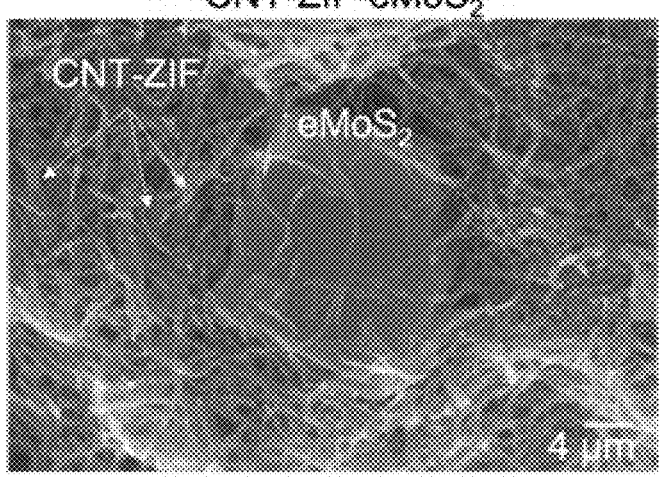

When the precursor masses were converted to the molarities for the synthesis of flower-like structure, the molarities of Mo and S sources correspond to 7 mmol and 56 mmol, respectively. Without wishing to be bound by theory, given a molar ratio of 1:8 (Mo:S), it is believed that $MoS_2$ flakes may absorb the redundant thiourea molecules during the synthesis, and that the molecules may prohibit the oriented crystalline growth of $MoS_2$. Thus, it is also believed that the small pieces of the $MoS_2$ layer were prevented from further growth and might gather and form the flower-like structure. In contrast, the ternary composite synthesized with a stoichiometric 1:2 molar ratio of Mo to S sources exhibits staked-plate structures ($pMoS_2$) as shown in FIG. 4B. As shown in FIG. 4C, CNT-ZIF-$eMoS_2$ composites were also prepared by mixing the CNT-ZIF powders with 10 mg of chemically exfoliated $MoS_2$ flakes.

Figure 2A:
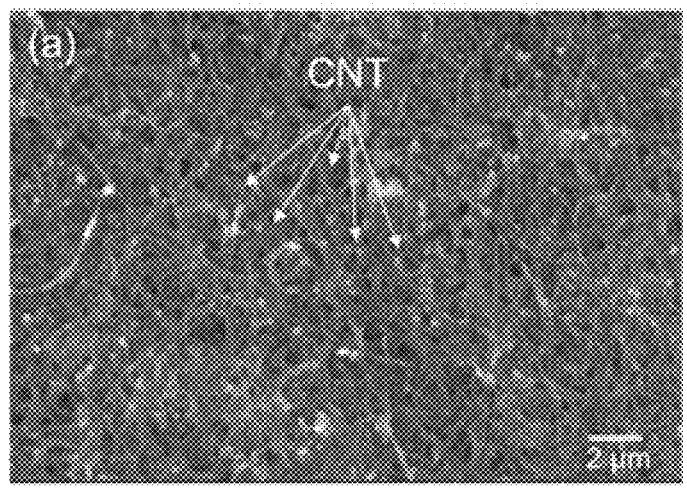
FIGS. 2A-2C are SEM images of, respectively, a CNT material, porous ZIF grown on a CNT material (CNT-ZIF), and $MoS_2$ grown on a CNT-ZIF material (CNT-ZIF-$fMoS_2$) in accordance with nonlimiting aspects of the present invention.
Figure 2B:
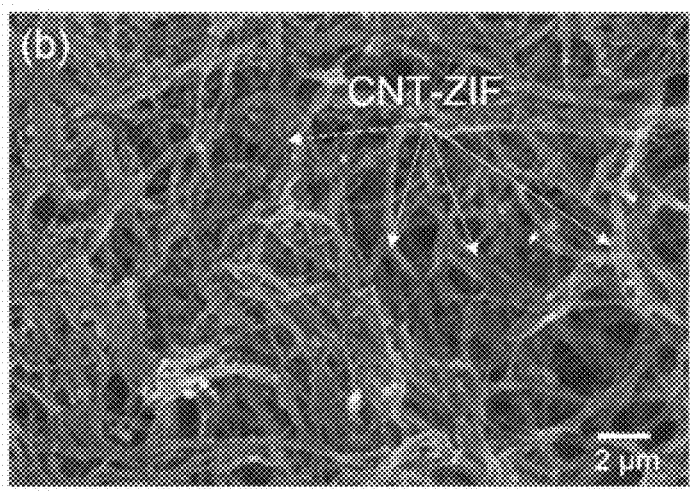
Figure 2C:
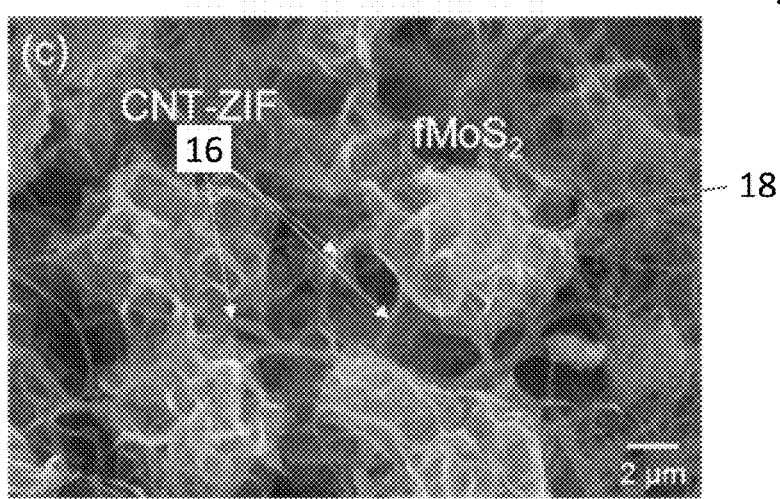
Figure 2D:
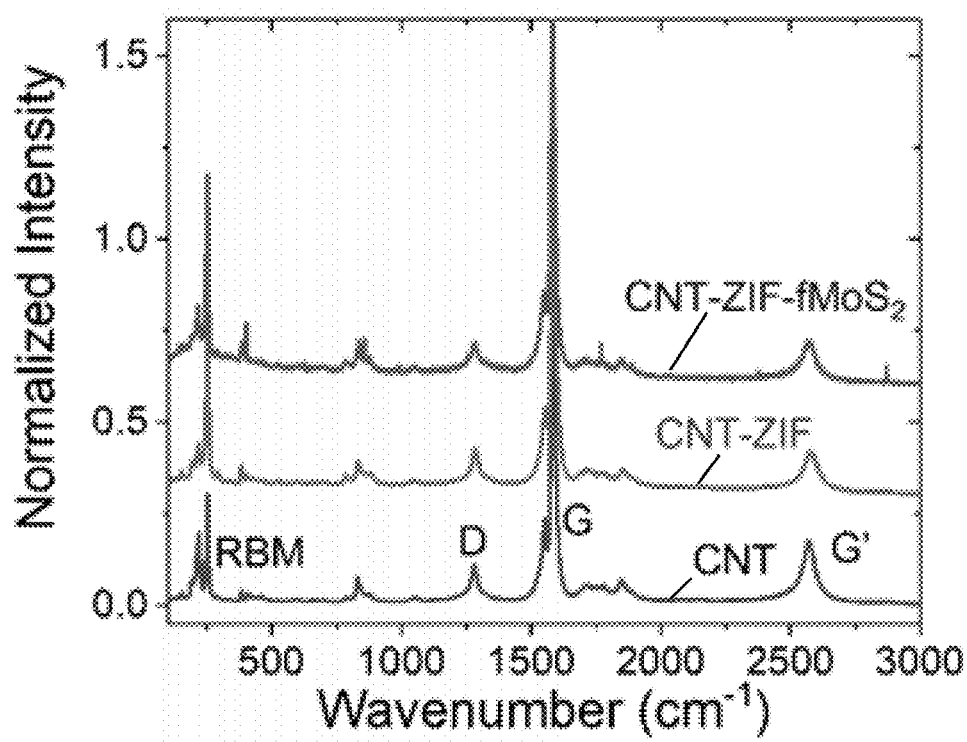
FIGS. 2D and 2E are graphs of Raman spectra of CNT, CNT-ZIF, $fMoS_2$, and CNT-ZIF-$fMoS_2$ materials.
Figure 2E:
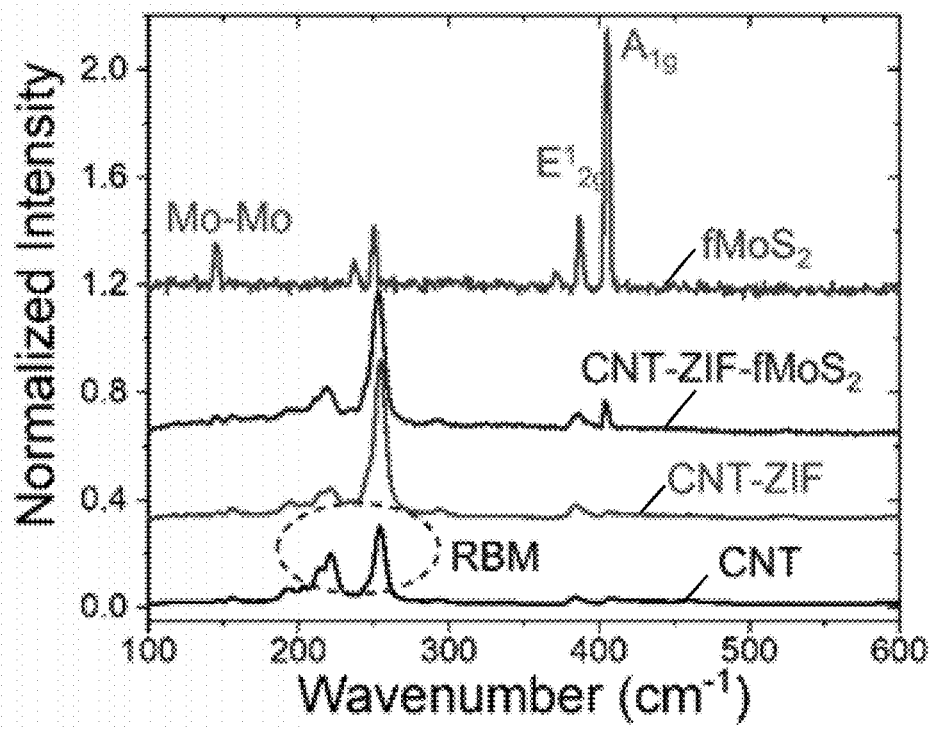
Figure 2F:
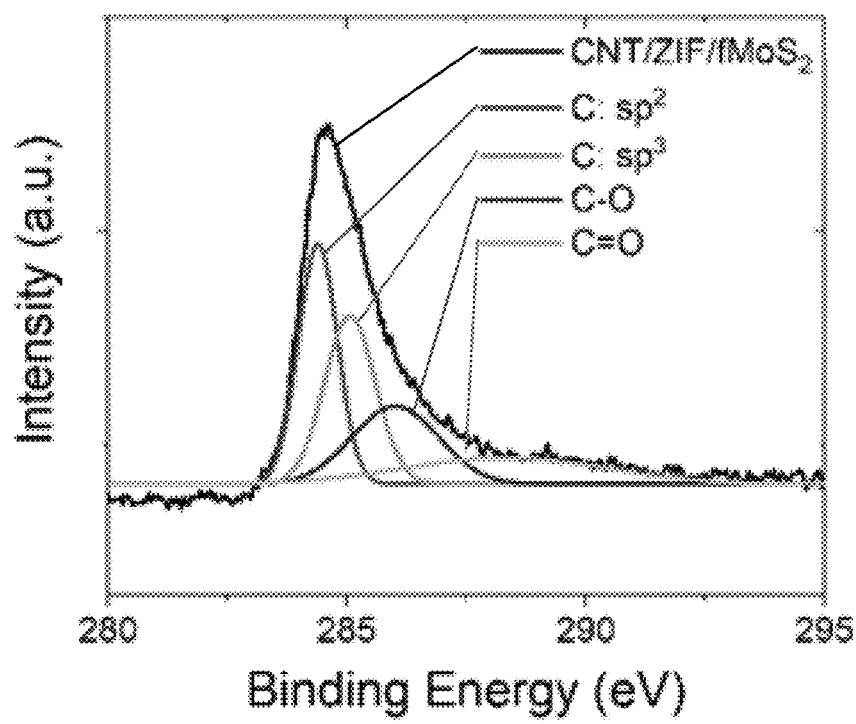
FIGS. 2F-2H are graphs of XPS spectra of a CNT-ZIF-$fMoS_2$ material.
Figure 2G:
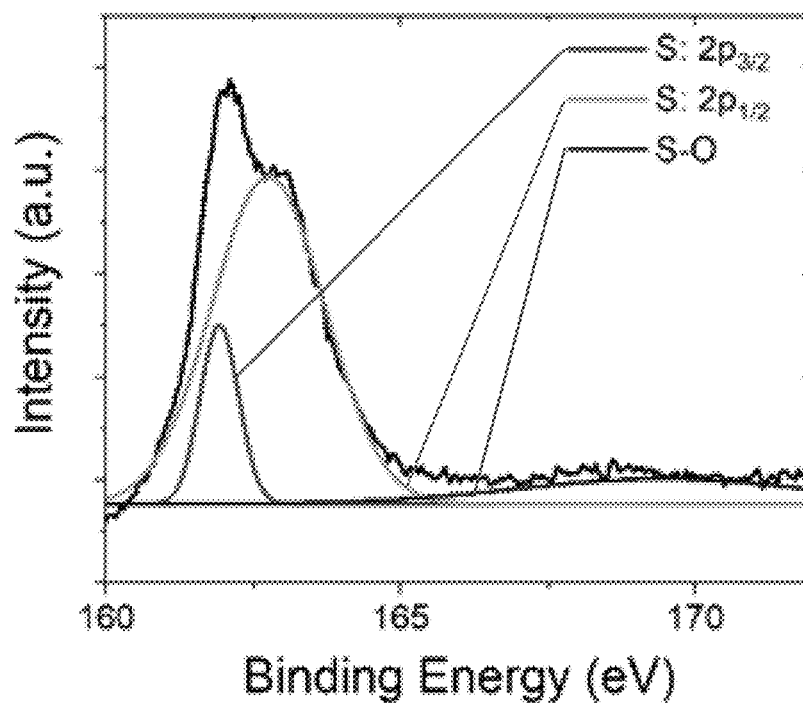
Figure 2H:
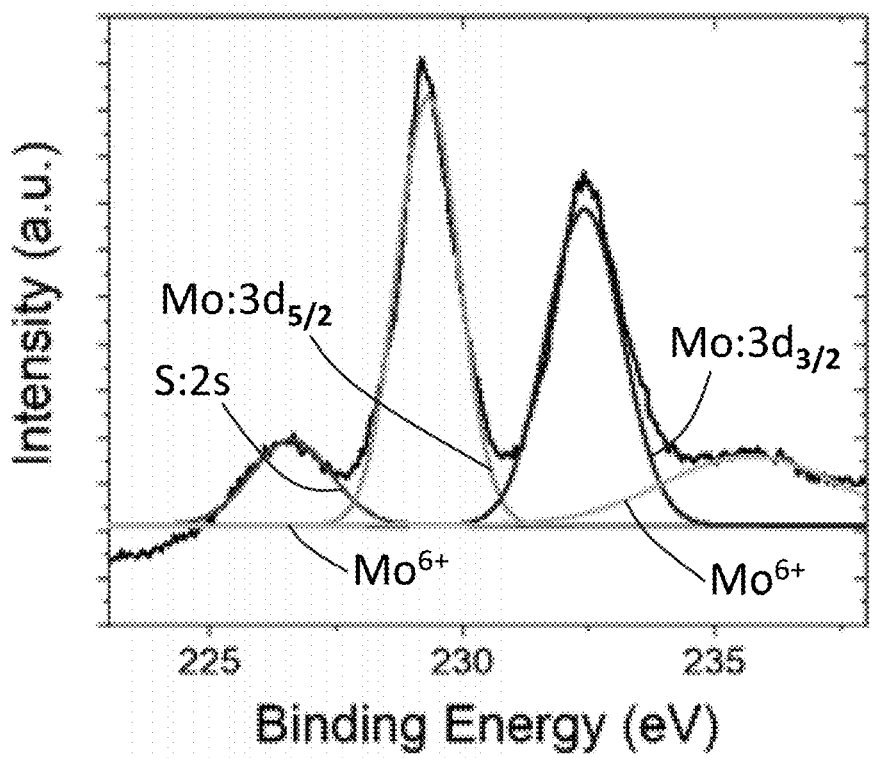

Turning to FIGS. 2A-2H, the structural features of the heteromaterials formed as described above were examined by using confocal Raman microscopy. In FIGS. 2A-2C, the morphology of each stage of the hybrid electrode 10 from the bare CNT network 12 to the ternary composite is shown in scanning electron microscopy (SEM) images. Several points are marked with white arrows showing the components. The pristine CNT network 12 (FIG. 2A) exhibited extremely thin tubular structures where the carbon nanotubes have an average diameter of approximately 1 nm. The composite CNT-ZIF structure 16 (FIG. 2B) exhibited significantly thicker tubes with a diameter of roughly 150 nm. The flower-like $MoS_2$ structures 18 (FIG. 2C) were characterized by curvy $MoS_2$ flakes. The single-wall CNT with an average diameter (d) of about 1 nm exhibited a densely percolated network. In FIG. 2B, the CNT-ZIF sample maintained a dense stem-like structure, similar to the pure CNT in FIG. 2A. However, the composite CNT-ZIF structure 16 exhibited significantly thicker tubes (d=about 150 nm). The composite CNT-ZIF structure 16 formed a hierarchical structure with an ultrathin CNT core surrounded by a porous ZIF shell. Lastly, the ternary composite synthesized with the unbalanced ratio of Mo and S exhibited unique structural features distinct and different from the other electrode materials (FIG. 2C). Many thin petals 22 of $fMoS_2$ were observed with several-micron-sized flower-like structures which were integrated with the CNT-ZIF. The TMD may provide active sites for ion accumulation and faradaic reaction. In FIG. 2D, Raman spectra of CNT, CNT-ZIF, and CNT-ZIF-$fMoS_2$ are shown and in FIG. 2E the spectra are expanded at low wavenumbers along with the Raman signatures of $fMoS_2$. The spectra are plotted offset for clarity. The samples containing CNT show G, D, radial breathing Raman modes (RBM), and G' Raman modes. The samples including the TMD flakes also show out-of-plane ($A_{1g}$) and in-plane ($E^1_{2g}$) vibration signatures of few-layer-thick $MoS_2$. In the XPS spectra of CNT-ZIF-$fMoS_2$ shown in FIGS. 2F-2H, FIG. 2F shows C 1s, FIG. 2G shows S 2s and Mo 3d, and FIG. 2H shows S 2p. The spectral deconvolution indicates sub-binding energies of the elements. The carbon peak shows comparable intensities of $sp^2$ and $sp^3$ electronic states, suggesting a successful synthesis of ZIF crystal. The sample also exhibited clear Mo and S peaks originating from the $MoS_2$.

As shown in FIG. 2D, the pristine CNT sample exhibited distinct G and D bands at approximately 1582 and 1281 $cm^{-1}$, respectively. The G-peak may be attributed to the stretching motions of carbon-to-carbon bonds, while the D-band arises from the disordered vibrational modes affected by defects and impurities in CNT. The D/G peak intensity ratio is measured at about 0.1, confirming a low-level of defects in the crystalline CNT. The RBM peaks at low wavenumbers (200about 300 $cm^{-1}$) verifies the average diameter of CNT.

As seen in FIG. 2E, the ZIF-wrapped CNT films, including CNT-ZIF and CNT-ZIF-$fMoS_2$, show different Raman characteristics as well as similar features compared to the pristine CNT. Both composite films show a D/G ratio of about 0.1, the same as that observed with the bare CNT. This indicates that the CNT structures do not deteriorate significantly during the ZIF synthesis. Thus, their conductive properties should be well retained. The G-and D-peaks of CNT-ZIF and CNT-ZIF-$fMoS_2$ are slightly shifted to longer wavenumbers (by about 2 $cm^{-1}$) from those of the pristine CNT. It is believed that the shifts to the residual compressive stresses in the CNT networks may be due to the coated ZIF layer. The Raman fingerprints suggest a successful formation of ZIF crystals on the CNT without damaging the conducting networks.

The ternary composite also exhibited the vibrational states of $MoS_2$, forbidden in the pristine CNT and CNT-ZIF. In FIG. 2E, the CNT-ZIF-$fMoS_2$ film exhibited distinct in-plain vibration ($E^1_{2g}$) and out-of-plane mode ($A_{1g}$) of $MoS_2$ at approximately 387 and 404 $cm^{-1}$, respectively. Though significantly weaker in intensity, the peaks are consistent with those in the pure $fMoS_2$ sample (green), indicating a successful synthesis of the TMD on CNT-ZIF. The peak position difference (about 17 $cm^{-1}$) between $E^1_{2g}$ and $A_{1g}$ suggests that the petal structures shown in FIG. 2C may mostly consist of a few-layer-stacked $MoS_2$ flakes. We also found that the ternary composite exhibited some distinguishable $MoS_2$ Raman characteristics from the bare $fMoS_2$. For example, CNT-ZIF-fMoS$_2$ exhibited a peak intensity ratio of A$_{1g}$/E$^1_{2g}$ about 1.8, which is smaller than that of fMoS$_2$ (about 3.8). This may be attributed to the presence of the carbon networks, hindering the out-of-plane vibration in MoS$_2$. The suppressed MoS$_2$ Raman peaks in the ternary composite were observed in another mode. In FIG. 2E, the fMoS$_2$ film exhibited a peak at around 146 cm$^{-1}$, which may arise from Mo-Mo stretching motions. Due to the interaction between the tubular structures and the TMD layer, the stretch mode was negligible in the ternary composite. The observation is consistent with other reports on composite electrodes made of CNT and MoS$_2$.

X-ray photoelectron spectroscopy (XPS) was measured to probe the electronic states of the elements in the composite. FIG. 2F shows the lowest orbital binding energy of the carbon atoms (C 1s) in the CNT-ZIF-fMoS$_2$ sample. The peak is located at about 284 eV, which is consistent with that of pristine CNT. To elucidate the C 1s state, the peak was deconvoluted with Gaussian functions considering sp$^2$, sp$^3$, C—O, and C═O of carbons, where they are observed at approximately 284.4, 285.2, 285.5, and 288.3 eV, respectively. CNT-ZIF-fMoS$_2$ exhibited unique characteristics compared to the pristine CNT. In FIG. 2F, the area covered by the sp$^3$ peak of the composite is comparable to that of the sp$^2$ state. In contrast, the pure CNT film exhibited a much weaker sp$^3$ orbital than the sp$^2$ state. This may originate from the intermediate ZIF layer forming a tetrahedral structure, thus resulting in the increased population of the sp$^3$ states. Additionally, the deconvoluted carbon states in the composite are slightly redshifted from those of the CNT. This may be attributed to the reduction of the carbon atoms by the excessive thiourea during the MoS$_2$ synthesis.

The XPS of the fMoS$_2$ composite showed Mo-and S-electronic states. With the similar deconvolution, the spectrum in FIG. 2G may be analyzed with four distinct states, including Mo$^{4+}$3d$^{5/2}$, Mo$^{4+}$3d$^{3/2}$, Mo$^{6+}$, and S 2s. The presence of the Mo-related peaks clearly indicates the presence of the TMD, whereas those peaks were not observed in the CNT and the CNT-ZIF films. Since the ZIF structure was constructed with the thiolated imidazolates, the CNT-ZIF sample exhibited S 2s peak at approximately 225 eV. It is believed that the thiolated frameworks may function as binding sites for flower-like MoS$_2$ by facilitating sulfide bonds between the heteromaterials. Lastly, the sulfur electronic states of the composite, including S 2p$_{3/2}$, S 2p$_{1/2}$, and S—O, at 162.0, 163.1, and 168.2 eV, respectively, were identified (FIG. 2F). The peak positions are consistent with other reports demonstrating chemically synthesized MoS$_2$, containing rich sulfur vacancies. Overall, the characterizations confirmed the successful synthesis of each component for the ternary composite.

The energy storage behavior of the composite electrode 10 was examined by using a potentiostat with a three-electrode system. It consists of working, platinum counter, and Hg/HgO reference electrodes in a 6 M KOH solution (see SI for the experimental details). The working electrode was prepared by depositing the ternary composite film with a diameter of about 1 cm on a small piece of nickel foam. The alkaline electrolyte with potassium ions was chosen by considering the stability of ZIF and the ion mobility. Previous publications reported that the ZIF structures prepared with the similar methods presented in this work demonstrated excellent alkaline and thermal stabilities. Among the abundant alkali metals in nature, the potassium ion has a small hydrated radius. Thus, the potassium-based alkaline medium can provide the fast ion mobility, resulting in a quick ion accumulation and release.

Figure 3A:
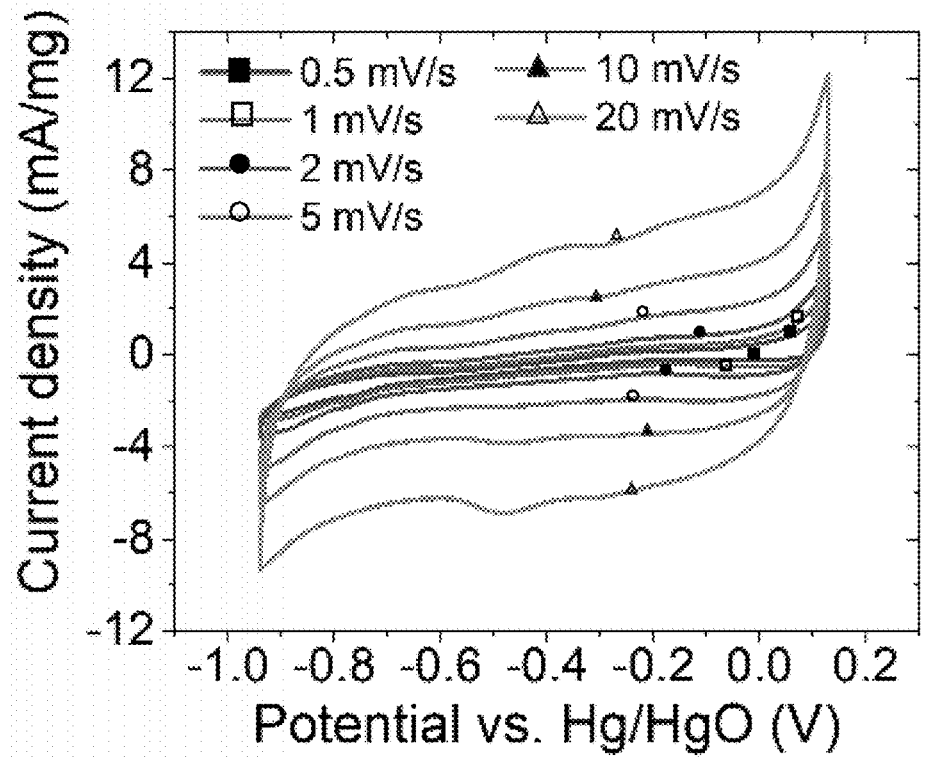
FIGS. 3A-3C are graphs illustrating certain electrochemical characterizations of a CNT-ZIF-$fMoS_2$ material.
Figure 3B:
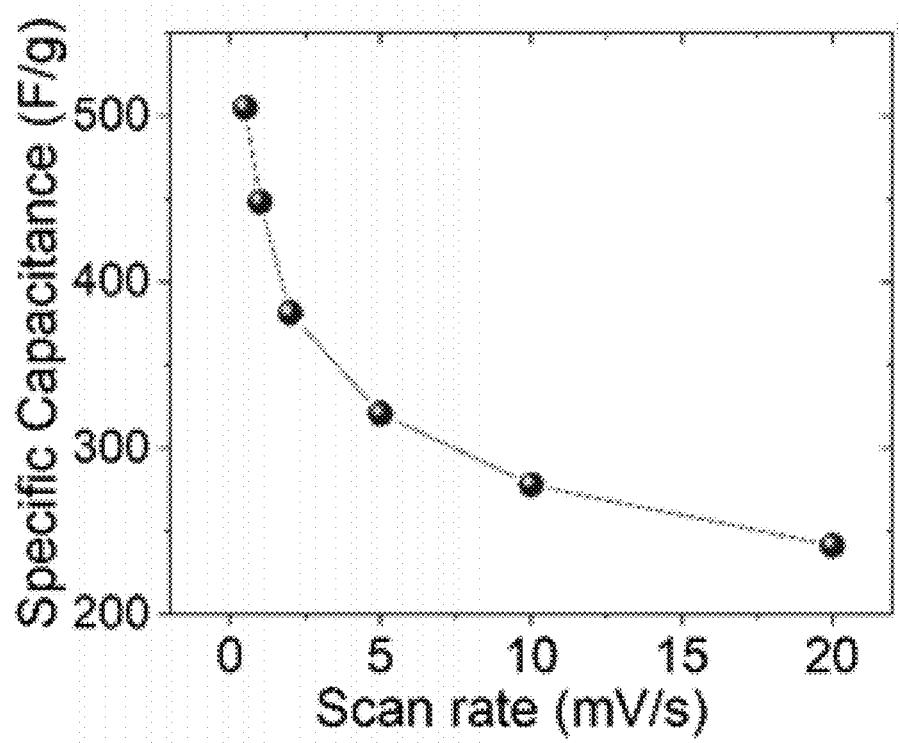
Figure 3C:
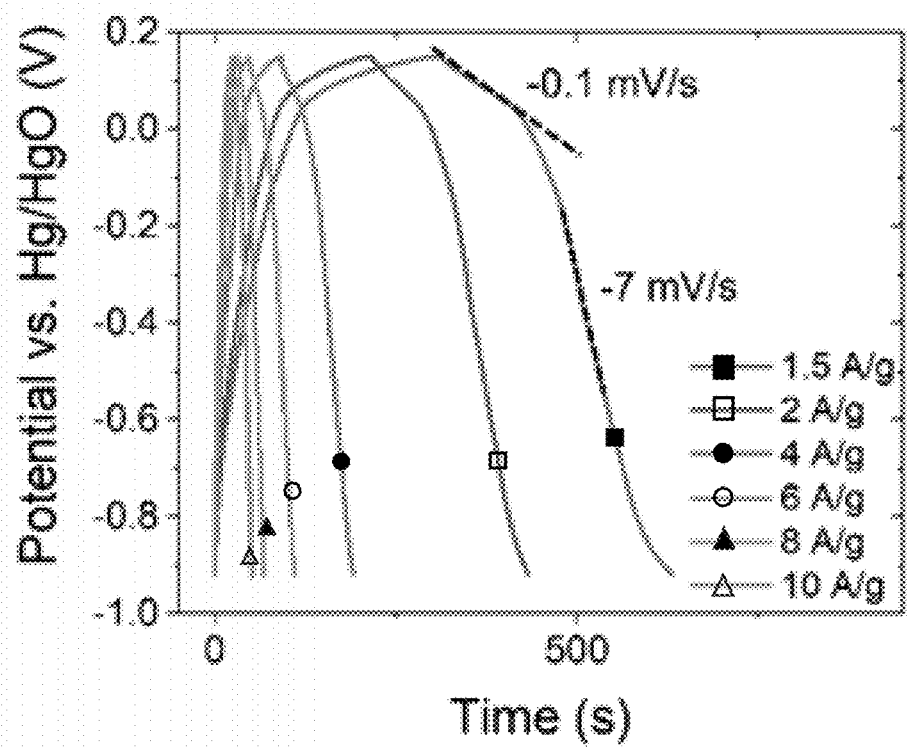

Given the electrochemical system, the current-voltage (CV) response of the hybrid electrode was monitored with cyclic voltammetry. FIGS. 3A-3C, illustrate data from measurements carried out with cyclic voltammetry using a three-electrode system in 6 M KOH electrolyte solution. The electric potential of the working electrode referenced with Hg/HgO was swept from 0.13 to −0.94 V at various scan rates, including 0.5, 1, 2, 5, 10, and 20 mV/s. The potential window was chosen to exclude the catalytic potential of the hydrogen (oxygen) evolution reaction to minimize the solvent degradation. Simultaneously, the potential range was determined to include the ion adsorption potential to maximize the current density (see SI for details). FIG. 3A shows current-voltage responses of the composite electrode under various scan rates of 0.5, 1, 2, 5, 10, and 20 mV/s. The area covered by the CV curve increases with the scan rate, which is a typical behavior of a supercapacitor. FIG. 3B shows specific capacitance of the electrode as a function of scan rate, showing a maximum specific capacitance of about 510 F/g at the lowest scan rate (0.5 m V/s). FIG. 3C shows GCD plots of the ternary electrode operating under various current densities ranging from 1.5 to 10 A/g. While discharging the device, the potential dropped slowly at a rate of −0.1 mV/s at approximately 0.05 V, attributed to the FPC response. The device exhibited a fast-discharging behavior with a rate of −7 mV/s at about −0.4 V from the EDLC process.

Due to the applied potential at the working electrode, ions were accumulated at the synthesized composite, thus generating the electric currents (FIG. 3A). The ternary electrode exhibited a semi-rectangular shape of the CV response with several cathodic/anodic peaks within the potential window, suggesting energy storage via both EDLC and FPC processes. The faradaic peaks originate from the charge transfer between potassium ions and the composite electrode, consistent with previous reports using CNT-and MoS$_2$-based electrodes. Based on the CV curves, we estimate the specific capacitance of the device as about 450 F/g at 1 mV/s. The excellent ion storage may be attributed to the synergistic effects of the CNT-ZIF-fMoS$_2$. The hybrid material formed a hierarchical structure with the high conductive core, the fast ion-diffusive intermediate layer, and the morphology-engineered ion-accumulating layer with faradaic reactivity. As the scan rate increases, the specific capacitance drops as shown in FIG. 3B. This is a typical behavior of electrochemical capacitors based on EDLC-and FPC-driven storage, where the capacitance is limited by ion mobility and diffusivity under high scan rates.

The ion storing performance was further confirmed in galvanostatic charging-discharging (GCD) measurements by varying the current density from 1 to 10 A/g with the same potential range adopted above (FIG. 3C). The specific capacitance from the GCD curves was evaluated as about 450 F/g at 1.5 A/g, and the capacitance gradually decreases. The semi-triangular GCD profiles indicate that the device operates through faradaic reaction and ion accumulation, consistent with the CV measurement. Under the discharging process, for example, the potential drops slowly at a rate of about 0.1 m V/s near 0.05 V (potential vs Hg/HgO), while it decreases with a much faster rate (about 7 mV/s) at around −0.40 V. Here, the former may rely on the FPC process, and the latter may be dominated by the EDLC mechanism.

The synergistic effects on the electrochemical performance may be maximized with an optimal mass ratio of the constituent materials. Among the samples with various mass ratios, the highest specific capacitance was obtained when similar amounts of CNT-ZIF and fMoS$_2$ were used for synthesis. In contrast, the composite with an unbalanced mass ratio of CNT-ZIF to fMoS$_2$ demonstrated a smaller specific capacitance. The observation suggests that it is important to select the constituent materials offering distinct merits and fabricate the composite with an optimal ratio for the best performances.

In addition to the types and ratios of the components, experiments were conducted to study whether the energy storage behavior of the hybrid supercapacitor may be dominated by the structural features of the electrode. To probe the effect of different electrode morphologies on the energy storage performance, the various morphologies of the ternary composites, including flower-like, stacked-plate, and exfoliated-flake MoS$_2$ morphologies integrated with CNT-ZIF prepared as described above were explored, shown in FIGS. 4A-4C, respectively. The mass ratios of the components were kept constant (i.e., CNT-ZIF: MoS$_2$=1:1) in the composites to minimize any unwanted impacts other than the morphological differences. Each composite exhibited a unique morphology. As seen in FIG. 4A, the ternary composite prepared with fMoS$_2$ (CNT-ZIF-fMoS$_2$) exhibited a distinct hierarchical architecture that resembles an ivy plant, wherein the flowers were formed of MoS$_2$ and weaved by CNT-ZIF stems. In contrast, the ternary composite material bearing pMoS$_2$ shown in FIG. 4B only shows stacked plates with lengths and widths over several micrometers. Here, the carbon networks may be buried under the TMD layer. The electrode with the exfoliated TMD shown in FIG. 4C has a MoS$_2$ flake in the middle connected with the carbon networks. The fMoS$_2$ crystals on the carbon networks appear uniform in size, with an average diameter of about 15 μm. On the other hand, the ternary composite prepared with a similar solvothermal method, but under the different ratio of the precursors (stoichiometric molarity, that is, Mo:S=1:2), exhibited an entirely different morphology. The CNT-ZIF networks are not visible in the SEM image. The TMD plates may completely cover the tubular structures. Even though the networks do not appear in the image, the ternary composite must contain them as confirmed by the Raman and XPS spectra in FIGS. 2D-2H. Lastly, the CNT-ZIF-eMoS$_2$ in FIG. 4C was characterized by a piece of MoS$_2$ flake surrounded by CNT-ZIF. Here, the flake had a size of several micrometers, and the tubes were mostly attached at the edges rather than the basal plane of the flake. This may be attributed to the sulfur-vacancy-rich (i.e., Mo-exposed) edges of MoS$_2$ flakes, providing the binding sites for ZIF.

Figure 4D:
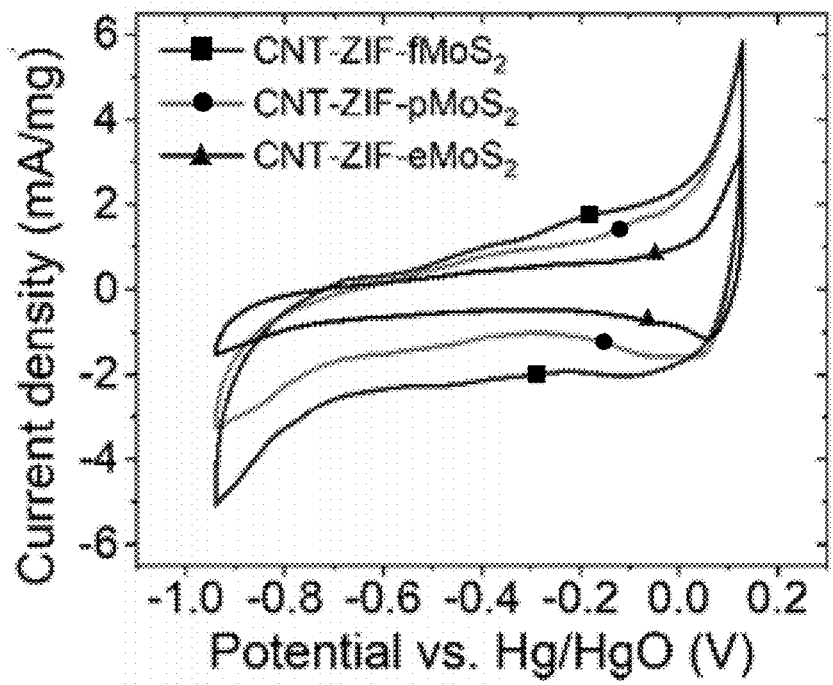
FIGS. 4D-4F are graphs illustrating data relative to the energy storage performance of the CNT-ZIF-$MoS_2$ materials of FIGS. 4A-4C.

The composite electrodes with these various morphologies were characterized by cyclic voltammetry measurements. FIG. 4D shows cyclic voltammetry profiles of the fMoS$_2$, pMoS$_2$, and eMoS$_2$ integrated composite electrodes at a scan rate of 5 mV/s. CNT-ZIF-fMoS$_2$ generates the greatest electric current and the largest area closed by the profile. The largest CV response was observed from the CNT-ZIF-fMoS$_2$ with the faradaic peaks due to the charge transfer between potassium ions and the composite electrode. The pMoS$_2$-embedded composite exhibited similar redox peaks, but its current level is lower than that with the CNT-ZIF-fMoS$_2$. The sample with eMoS$_2$ exhibited the smallest CV profile with a redox peak at around 0.1 V. From the measurements, the specific capacitances of the composites were estimated. The CNT-ZIF-fMoS$_2$ yields a specific capacitance of about 320 F/g, which is much higher than those by the pMoS$_2$-and eMoS$_2$-based composites (approximately 220 and 120 F/g, respectively). The results suggest that the energy-storage performance of the supercapacitor electrode is highly affected by the electrode architecture.

To elucidate the charge storage mechanism of the ternary composite, kinetics analyses were carried out on the CV responses. The analysis allowed the contributions of surface-controlled EDLC and diffusion-controlled FPC in the CV profile to be quantified. The energy storage behaviors were anaylzed by modeling the CV responses with a power-law equation:

$$i(V) = k_1 v + k_2 v^{1/2} \quad \text{(Eq. 1)}$$

where i represents the electric current at the fixed potential (V) monitored by the cyclic voltammetry measurement. $k_1$ and $k_2$ are the constants for the EDLC-and FPC-driven currents, respectively. v is the scan rate sweeping the electric potential of the working electrode. The FPC current profile of CNT-ZIF-fMoS$_2$ operating at 5 mV/s exhibited faradaic peaks at approximately −0.60 and 0.05 V. Without wishing to be bound by theory, it is believed that the peak observed at −0.60 V may originate from the proton adsorption at the composite surface. The rise and fall of the current at 0.05 V may be understood with the catalytic effects of potassium ions. At the potential above 0.05 V, the outer fMoS$_2$ of the ternary composite were believed to interact with the alkali ions: K$^+$+e$^-$+fMoS$_2$↔fMoS$_2$-K. The adsorbed cations were believed to receive electrons from the composite electrode, thus generating the faradaic current.

Figure 4E:
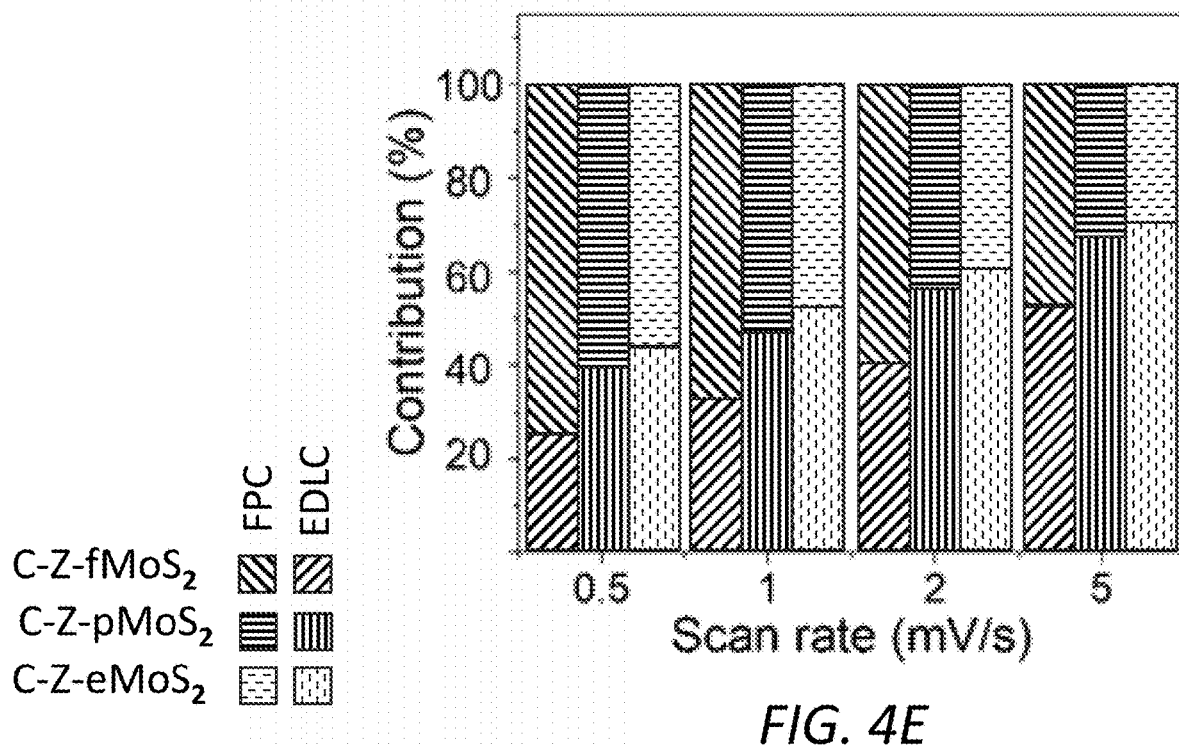

From the same analysis, the capacitance contributions for the three composite samples at various scan rates from 0.5 to 5 mV/s were estimated, as shown in FIG. 4E. FIG. 4E shows relative contributions of EDLC and FPC mechanisms at the scan rate of 0.5, 1, 2, and 5 mV/s. Overall, the CNT-ZIF-fMoS$_2$ demonstrated a greater contribution of the FPC-driven energy storage than the other electrodes made of pMoS$_2$ and eMoS$_2$. The electrodes shared a similar trend as well as show apparent differences. In all composites, the EDLC contributions increased with higher scan rates. The surface-controlled current with constant $k_1$ varied as a function of the scan rate, while the diffusive current depended on $v^{1/2}$ with constant $k_2$ (eq. 1). Therefore, the EDLC current will increase at a greater pace with increasing scan rate than the FPC-driven mechanism. On the other hand, the overall contributions of the two processes varied among the composites. For example, the ternary composite with fMoS$_2$ generated approximately 68% of the current from the FPC process at 1 mV/s, which is greater than those of pMoS$_2$-and eMoS$_2$-integrated electrodes, about 53 and 48%, respectively. Similarly, CNT-ZIF-fMoS$_2$ exhibited the highest contribution of FPC mechanism at other scan rates.

The dominant pseudocapacitance behavior of the CNT-ZIF-fMoS$_2$ may be understood with the electrode morphologies. Without wishing to be bound by any particular theory, it is believed that, compared to the stacked MoS$_2$ plates in CNT-ZIF-pMoS$_2$ and the exfoliated MoS$_2$ flakes in CNT-ZIF-eMoS$_2$, the flower-like structure appears to offer a greater surface area for faradaic active sites. During the fMoS$_2$ synthesis, the excess thiourea molecules appeared to adsorb on the surfaces of synthesized MoS$_2$ nanosheets and further hinder the oriented crystalline growth. This may enable a defect-rich and fragmented growth of MoS$_2$ nanosheets. The fractured MoS$_2$ nanoflakes appeared to gather and develop the flower-like nanostructures to minimize the surface energy, offering Mo-exposing edges (i.e., sulfur vacancies). It has been reported that the Mo-edges may behave as active sites for efficient charge transport than the basal plane. As the heterogeneous charge transfer occurs at the TMD edges, the CNT-ZIF-fMoS$_2$ may generate greater electrochemical currents with the FPC-controlled processes than the other composites. Unlike the CNT-ZIF-pMoS$_2$ lacking openings, the composite with fMoS$_2$ is believed to also offer sufficient diffusion paths for ions with many pores. Due to its unique morphological features, the CNT-ZIF-fMoS$_2$ electrode is capable of dominating the other composites in the performance with the high contribution of FPC-driven storage.

Figure 4F:
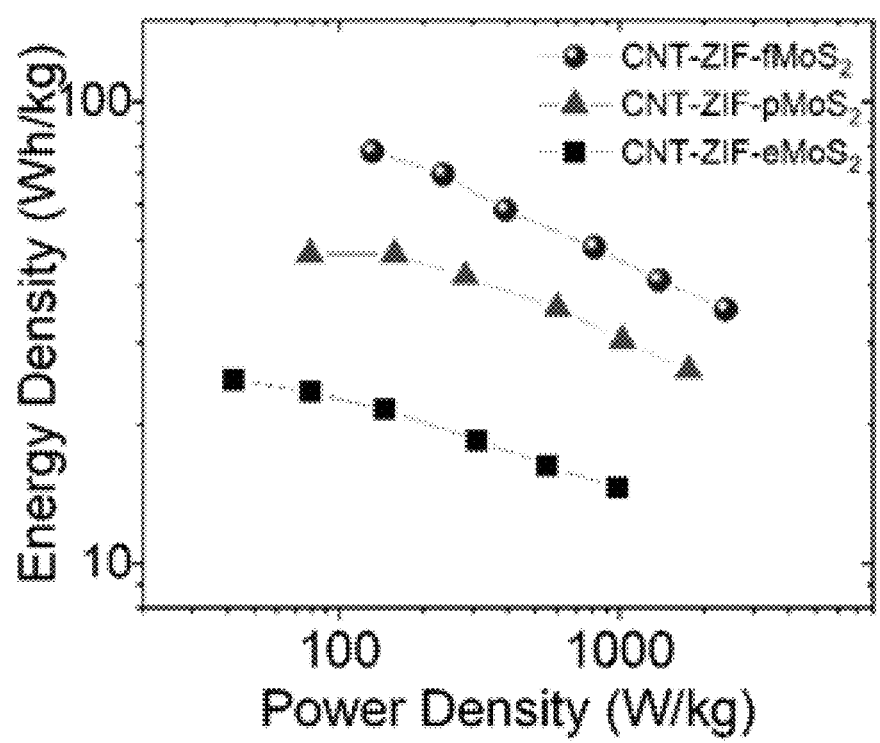

FIG. 4F is a Ragone plot showing the energy and power densities at various scan rates and compares the energy and power densities of our supercapacitor electrodes with those of other energy devices, estimated with the following equations:

$$E = \frac{C\Delta V^2}{2} \quad \text{(Eq. 2)}$$

$$P = \frac{E}{\Delta t} \quad \text{(Eq. 3)}$$

where ((with a unit of F/g) is the specific capacitance of the electrode and $\Delta V$ (V) represents the voltage window of the test. $\Delta t$ (s) is the total time of the experiment. E (Wh/kg) and P (W/kg) are the specific energy and power, respectively. The CNT-ZIF-fMoS$_2$ electrode exhibited an energy density of about 78 Wh/kg at a scan rate of 0.5 m V/s and a maximum power density of about 3,000 W/kg at 20 mV/s. These were significantly higher than the energy densities of the CNT-ZIF-pMoS$_2$-integrated composite (about 46 Wh/kg) and the eMoS$_2$-integrated composite (about 25 Wh/kg).

The CNT-ZIF-fMoS$_2$ electrode 10 also exhibited an ultralong cyclic stability. The specific capacitance of the CNT-ZIF-fMoS$_2$ composite was monitored under 3,000 continuous GCD cycles at a current density of 5 A/g. The supercapacitor retained approximately 90% of the original capacitance at 3,000 cycles. This excellent stability may be attributed to the reversible EDLC and FPC interactions between ions and our ternary electrode. Additionally, the electrode demonstrated unchanged morphological features after the reliability test, indicating the stable structure of CNT-ZIF-fMoS$_2$ for ion adsorption and desorption.

The present disclosure provides a strategy to significantly enhance the energy-storage performance of a supercapacitor by engineering electrode morphologies with ternary composites that offer distinct benefits for energy-storage applications. The electrodes are fabricated with conductive networks of carbon nanotubes (CNT) coated with zeolitic imidazole framework (ZIF) for high ion diffusivity and ion-accumulating molybdenum disulfide (MoS$_2$) with various morphologies. These include flower-like (fMoS$_2$), stacked-plate (pMoS$_2$), and exfoliated-flake (eMoS$_2$) structures from topochemical synthesis. The CNT-ZIF-fMoS$_2$ electrode exhibited an excellent energy density of about 78 Wh/kg and a maximum power density of about 3,000 W/kg, which is significantly superior to the electrodes containing pMoS$_2$ and eMoS$_2$ and is believed to be attributable to the increased surface area and the faradaic reactivity offered by fMoS$_2$. Additionally, the CNT-ZIF-fMoS$_2$ electrode exhibited exceptional stability with about 90% capacitance retention over 3,000 cycles. From this, it is believed that the electrode morphologies can dominate the energy-storage behaviors and that the heteromaterials approach may be crucial in designing next-generation supercapacitors.

The present disclosure thereby provides a morphology-engineered supercapacitor electrode 10 composed of CNT, ZIF, and fMoS$_2$ and capable of exhibiting an ultrahigh energy density of over 78 Wh/kg with a long cyclic stability. Experiments showed that the exceptional performance of the electrode 10 appears to be attributable to the unique morphology of the electrode, showing ion-capturing flower-like MoS$_2$ structures 18 stemming from highly conductive and porous composite CNT-ZIF structure 16. Given the ternary composites studied, modifying the properties of the constituent components may further improve the energy storage. For example, the semiconducting 2H phase MoS$_2$ may be converted to the metallic IT phase to further increase the FPC-driven currents. In addition, the ZIF coating 14 may be fully carbonized via pyrolysis to achieve an even higher overall conductivity. Furthermore, the faradaic reaction between the electrode 10 and the ions is highly affected by the electrode work function, thus doping with hetero-atoms could tune the electrode reactivity. Overall, this approach may form the basis for developing a wide range of next-generation supercapacitor electrodes in accordance with the teachings of the present disclosure.

Other aspects and advantages of this invention will be further appreciated from nonlimiting embodiments, investigations, etc., described in the attached Appendix A, the contents of which are incorporated herein by reference. While aspects of the invention are described and disclosed in terms of particular embodiments, it should be apparent that alternatives could be adopted by one skilled in the art. It should also be understood that the invention is not necessarily limited by descriptions, results, conclusions, or other statements that may be contained herein or in Appendix A, though such statements may have been reasonably based on information and opinions that existed at the time Appendix A was written.

As previously noted above, though the foregoing detailed description describes certain aspects of one or more particular embodiments of the invention, alternatives could be adopted by one skilled in the art. For example, the composite electrode, supercapacitor, ternary electrode material for the composite electrode, and their components could differ in appearance and construction from the embodiments described herein and shown in the drawings, functions of certain components of the composite electrode, supercapacitor, ternary electrode material could be performed by components of different construction but capable of a similar (though not necessarily equivalent) function, and various materials could be used in the fabrication of the composite electrode, supercapacitor, ternary electrode material, and/or their components. As such, and again as was previously noted, it should be understood that the invention is not necessarily limited to any particular embodiment described herein or illustrated in the drawings.

The invention claimed is:

1. A composite electrode for a supercapacitor, the electrode comprising:
    a composite CNT-ZIF structure comprising a conductive network of carbon nanotubes (CNT) and a zeolitic imidazole framework (ZIF) coating covering the conductive network, the ZIF coating providing high ion diffusivity; and
    a layer of molybdenum disulfide (MoS$_2$) structures disposed on the composite CNT-ZIF structure, the MoS$_2$ structures comprising pores that provide diffusion paths for ions to and/or from the ZIF coating and/or the conductive network of CNT, wherein the MoS$_2$ structures have a flower-like (fMoS$_2$) morphology.

2. The composite electrode of claim 1, wherein the electrode provides an energy density of at least about 78 Wh/kg.

3. The composite electrode of claim 1, wherein the electrode provides a power density of about 3,000 W/kg.

4. The composite electrode of claim 1, wherein the electrode provides about 90% of capacitance retention over 3,000 cycles.

5. A supercapacitor comprising:
a composite electrode according to claim 1; and
an electrolyte configured to provide ions for adsorption and/or desorption on the composite electrode.

6. The supercapacitor of claim 5, wherein the supercapacitor is a hybrid supercapacitor.

7. A method of fabricating a ternary electrode material having a flower-like molybdenum disulfide (fMoS$_2$) morphology for a composite electrode, the method comprising:
fabricating a MoS$_2$ structure on a composite CNT-ZIF structure to form the ternary composite electrode material, the composite CNT-ZIF structure comprises a carbon nanotubes (CNT) core surrounding by a porous zeolitic imidazole framework (ZIF) shell, and during the fabricating step an architecture of the MoS$_2$ structure is controlled by adjusting a molar ratio of Mo and S reagents so as to form edge-rich flower-like MoS$_2$ structures with sulfur vacancies (fMoS$_2$).

8. The method of claim 7, wherein the step of forming the composite CNT-ZIF structure comprises growing porous ZIF on CNT network via a solvothermal process.

9. The method of claim 7, wherein the step of fabricating the MoS$_2$ structure comprises adjusting the molar ratio of Mo and S reagents to provide excessive supply of sulfur precursors to molybdenum molecules.

10. The method of claim 9, wherein the step of fabricating the MoS$_2$ structure comprises adjusting the molar ratio of Mo and S reagents to provide a supply of molybdenum molecules to sulfur precursors in a Mo:S ratio of approximately 1:8.

11. The method of claim 7, wherein the step of fabricating the MoS$_2$ structure comprises blending thiourea and ammonium heptamolybdate tetrahydrate in an aqueous solution containing CNT-ZIF to form sulfur(S) precursors and molybdenum (Mo) precursors.

12. The method of claim 7, wherein the step of fabricating the MoS$_2$ structure comprises fabricating a layer of a plurality of the MoS$_2$ structures on the composite CNT-ZIF structure.

13. The method of claim 7, further comprising forming the composite CNT-ZIF structure comprising a CNT core surrounded by a porous ZIF shell.

14. A ternary material comprising:
a composite CNT-ZIF structure comprising a conductive network of carbon nanotubes (CNT) and a zeolitic imidazole framework (ZIF) coating covering the conductive network; and
a layer of molybdenum disulfide (MoS$_2$) structures disposed on the composite CNT-ZIF structure, the MoS$_2$ structures comprising pores that provide diffusion paths for ions to and/or from the ZIF coating and/or the conductive network of CNT, wherein the MoS$_2$ structures have a flower-like (fMoS$_2$) morphology.

* * * * *